United States Patent [19]
Walsh et al.

[11] Patent Number: 5,174,719
[45] Date of Patent: Dec. 29, 1992

[54] METHOD AND APPARATUS FOR DEPLOYING RAM AIR TURBINE AND LUBRICATING GEAR DRIVE THEREFROM

[75] Inventors: Richard E. Walsh; Craig S. Legault, both of Rockford, Ill.

[73] Assignee: Sundstrand Corporation, Rockford, Ill.

[21] Appl. No.: 650,881

[22] Filed: Feb. 6, 1991

[51] Int. Cl.⁵ .............................................. B64C 11/28
[52] U.S. Cl. ................................ 416/142; 416/170 R; 416/174; 60/698; 184/6.11; 244/58
[58] Field of Search ....................... 415/110, 111, 112; 416/170 R, 174, 142 R; 60/698; 184/6.11; 244/58

[56] References Cited

U.S. PATENT DOCUMENTS

| | | |
|---|---|---|
| 3,810,528 | 5/1974 | Morley et al. |
| 4,676,458 | 6/1987 | Cohen ................................ 244/58 |
| 4,683,985 | 8/1987 | Hultgren . |
| 4,717,095 | 1/1988 | Cohen et al. ...................... 244/58 |
| 4,742,976 | 5/1988 | Cohen ................................ 244/58 |
| 4,856,273 | 8/1989 | Murray . |
| 4,858,426 | 8/1989 | Holcomb . |
| 4,991,796 | 2/1991 | Peters et al. ..................... 244/58 |

FOREIGN PATENT DOCUMENTS 0051052 7/1974 Australia .................... 416/170 R Primary Examiner—Edward K. Look
Assistant Examiner—Christopher M. Verdier
Attorney, Agent, or Firm—Antonelli, Terry, Stout & Kraus

[57] ABSTRACT

Drag produced by cold, viscous oil, interacting with the gear meshes of a gear drive (8) connected to a ram air turbine (2) of an aircraft (1), is controlled to allow proper start-up of the ram air turbine. The lubricating oil is isolated from the gear meshes in remote sumps (11, 12) when the turbine is located in the stowed, inoperative position. An oil metering orifice controls the oil flow from the remote sumps to gearbox sumps with movement of the turbine from the stowed position (A) to the deployed position (B), so as to delay the application of cold, viscous coil to the gear meshes until after start-up of the turbine. This avoids excessive start times and failure to start from the high drag caused by cold, viscous oil on the gear meshes.

18 Claims, 4 Drawing Sheets

METHOD AND APPARATUS FOR DEPLOYING RAM AIR TURBINE AND LUBRICATING GEAR DRIVE THEREFROM

TECHNICAL FIELD

The present invention relates to a method and apparatus for deploying a ram air turbine of an aircraft and, more particularly, to a method and apparatus for lubrication of the gear meshes of a gear drive operatively connected to the ram air turbine.

BACKGROUND ART

It is known to provide a ram air turbine on an aircraft for powering an auxiliary or emergency hydraulic power supply of the aircraft in case of engine failure, for example. Typically, the ram air turbine is stowed in an up, stowed position where the turbine is inoperative during normal operation of the aircraft. In case of engine failure in flight, the ram air turbine is pivoted to a lower, deployed position where the blades of the turbine are exposed to the passing air stream for rotating the turbine blades. The output of the turbine drives a pump for the auxiliary or emergency hydraulic power supply. In the past, this pump has been located on the bottom of the turbine for direct drive by the turbine. However, it has been found to be preferable under certain circumstances to locate the pump for the auxiliary hydraulic power supply above the turbine and to employ an intermediate gear drive between the turbine and the pump for driving the pump.

A characteristic of an auxiliary power ram air turbine with variable pitch blades, during start-up, is limited torque when transitioning from coarse pitch to fine pitch blade position. The gear meshes in a gear drive between the turbine and the pump of necessity must be lubricated. Temperatures at high altitudes can be as low as −20° F. to −85° F. In accordance with the present invention, it has been found that the lubricating oil at these low temperatures is so viscous that the drag on the gear drive from the lubricating oil can undesirably delay or prevent start-up of the turbine when it is moved to the deployed position.

U.S. Pat. No. 3,810,528 to Morley discloses a turbine with a lubricant tank located remote from the gearing which is to be lubricated. U.S. Pat. No. 4,858,426 to Holcomb discloses a secondary oil flow operable in a vertical position and gravity fed from a remote reservoir tank 60. U.S. Pat. No. 4,856,273 to Murray discloses a secondary oil system including a secondary annular oil tank and discharge orifice which is gravity fed when in the vertical position. U.S. Pat. No. 4,683,985 to Hultgren discloses a remote sump in a lubricant system for a vertical shaft.

DISCLOSURE OF INVENTION

An object of the present invention is to solve the aforementioned problems in deploying an auxiliary power ram air turbine on an aircraft to ensure prompt starting of the turbine even at extremely low temperatures where a lubricating oil for a gear drive is viscous. A further object of the invention is to provide an improved method and apparatus for deploying a ram air turbine of an aircraft which enables the drag load on the gear drive caused by the gear drive lubricant to be controlled to ensure proper start-up of the ram air turbine.

These and other objects of the invention are attained by the method of the invention for deploying a ram air turbine on an aircraft with a gear drive operatively connected to the turbine and having at least one gear mesh, where the ram air turbine is movable relative to the aircraft between a stowed position where the turbine is inoperative and a deployed position where the turbine is operated. The method comprises moving the ram air turbine from the stowed position to the deployed position for operating the turbine and controlling the drag load on the at least one gear mesh of the gear drive from a lubricating oil for the gear mesh at least when the lubricating oil is cold and viscous so as not to excessively delay or prevent start-up of the ram air turbine.

According to the disclosed, preferred embodiment of the method, the step of controlling the drag load includes delaying application of the lubricating oil to the at least one gear mesh, at least when the lubricating oil is cold and viscous, until after the ram air turbine has been started. By delaying the application of the lubricating oil to the at least one gear mesh for a period of at least ten to twenty seconds from deployment of the turbine, there is sufficient time to commence rotation of the blades of the turbine and for transitioning of the variable pitch blades from coarse pitch to fine pitch blade position before the drag is increased by application of the cold, viscous oil.

A further step of the disclosed method includes isolating the lubricating oil from the at least one gear mesh prior to moving the ram air turbine from the stowed position to the deployed position The step of isolating includes flowing the lubricating oil by the force of gravity away from the at least one gear mesh when the ram air turbine is moved to the stowed position. The isolated lubricating oil is then flowed to the at least one gear mesh by way of an oil metering orifice or orifices for delaying the delivery of cold, viscous oil to the at least one gear mesh when the ram air turbine is moved to the deployed position.

An apparatus according to the invention for lubricating a gear mesh of a gear drive operatively connected to a ram air turbine on an aircraft, the ram air turbine being movable relative to the aircraft between a stowed position where the ram air turbine is inoperative and a deployed position for operating the ram air turbine, comprises a remote oil sump for lubricating oil for the gear mesh. The remote oil sump isolates oil from the gear mesh when the ram air turbine is in the stowed position. The apparatus further comprises means for controllably delivering lubricating oil from the remote oil sump to the gear mesh when the ram air turbine is moved from the stowed position to the deployed position so that when the lubricating oil is cold and viscous it does not reach the gear mesh until the turbine has started operation. The means for controllably delivering the lubricating oil comprises a passage between the remote oil sump and a gearbox oil sump in which the gear mesh is located. The passage includes a metering orifice which delays the flow of cold, viscous oil from the remote sump to the gearbox sump until the turbine has started operation.

In the deployed position of the ram air turbine, the remote lubricating oil sump is located higher than the gearbox sump so that gravity causes the lubricating oil to flow through the passage from the remote sump to the gearbox sump, and in the stowed position the gearbox sump is higher than the remote sump so that gravity causes the lubricating oil to flow through the passage from the gearbox sump to the remote sump. In the disclosed embodiment, the gear drive comprises two gear meshes. A remote sump, passage and gearbox sump is provided for each gear mesh. A metering orifice is located in the passage between each remote sump and its associated gearbox sump for delaying delivery of cold, viscous oil to the gear meshes.

These and other objects, features and advantages of the present invention will become more apparent from the following description when taken in connection with the accompanying drawings, which show, for purposes of illustration only, one embodiment in accordance with the present invention.

BEST MODE FOR CARRYING OUT THE INVENTION

Figure 1:
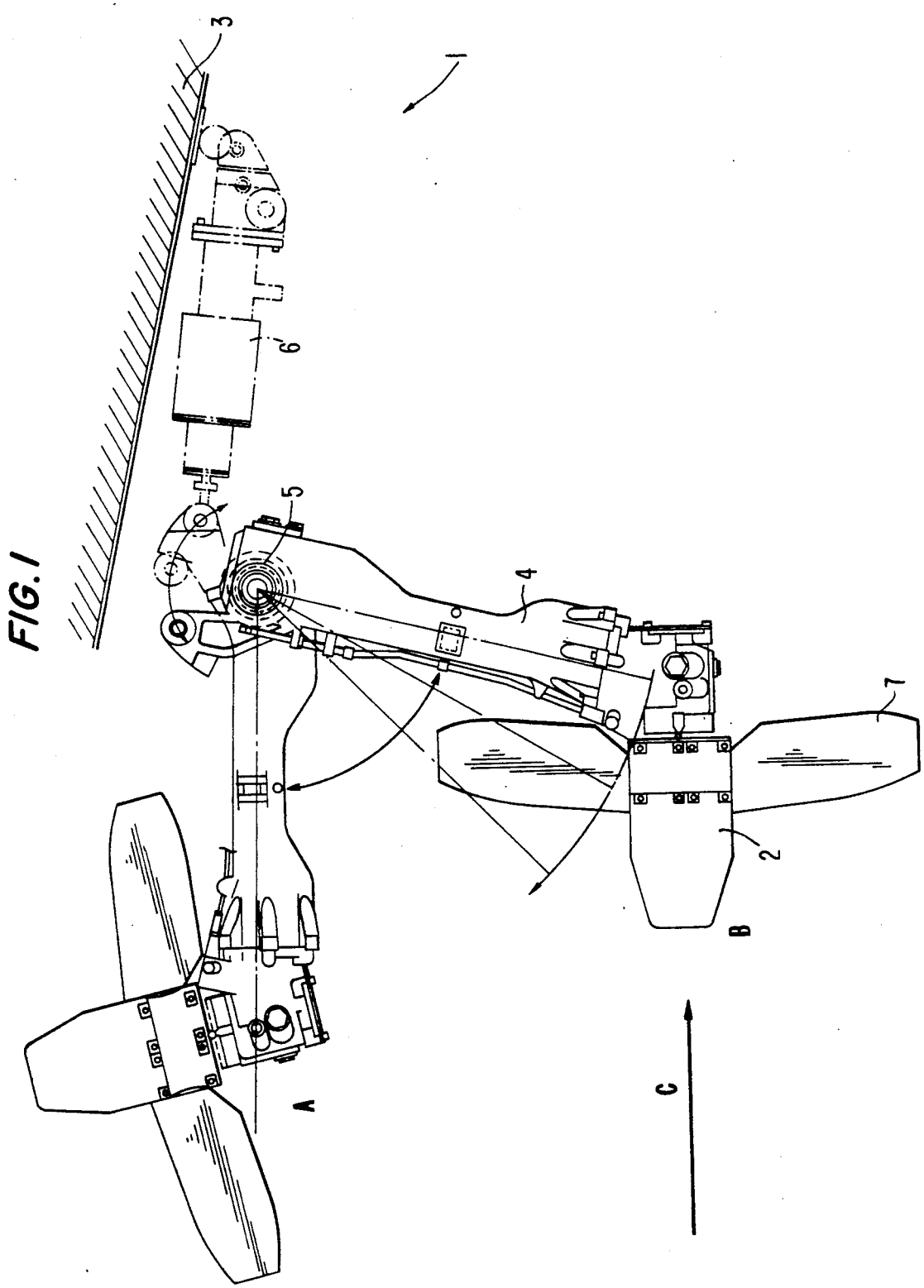
FIG. 1 is a side view, partially in cross section, of a portion of an aircraft with an auxiliary power ram air turbine pivotably supported on the underside of the aircraft for movement between a stowed position and a deployed position, both of which are shown in FIG. 1.

Referring now to the drawings, a portion of the underside of an aircraft 1 is illustrated in FIG. 1. The aircraft includes an auxiliary power ram air turbine 2 supported on the lower frame 3 of the aircraft. The ram air turbine 2 is supported at the outer free end of a support casing or housing 4. The support casing 4 is pivotably connected at its opposite, upper end at pivot 5 secured to the frame 3 of the aircraft. A hydraulic actuator 6 extends between the upper end of the support casing 4 and frame 3 of the aircraft 1 for pivoting the ram air turbine 2 and its support casing 4 about the pivot 5 between a stowed position A and deployed position B. The turbine is inoperative in the stowed position. It is pivoted to deployed position B for operation of the turbine.

When the turbine is moved to the deployed position B, variable pitch blades 7 of the turbine 2 are acted upon by the air stream moving relative to the aircraft 1 in the direction of arrow C shown in FIG. 1, for rotating the blades and turbine 2. The power from the turbine 2 is used to drive a pump, not shown, for providing auxiliary/emergency hydraulic power supply on the aircraft such as in case of engine failure. The pump is located above the ram air turbine 2 and its support casing 4. Rotary motion from the turbine 2 is transmitted to the pump by way of a gear drive 8 which extends from the turbine 2 through the support casing 4. The gear drive 8 includes two right angled gear sets 9 and 10.

The gear meshes of the right angled gear sets 9 and 10 of gear drive 8 must be lubricated during operation of the auxiliary/emergency hydraulic power supply on the aircraft. One characteristic of the auxiliary power ram air turbine 2 during start-up, with variable pitch blades 7, is limited torque when transitioning from coarse pitch to fine pitch blade position. It has been found that drag produced by cold, viscous lubricating oil at temperatures of 31 20° F. to −85° F. encountered at higher altitudes, interacting with the gear meshes of the right angled gear sets 9 and 10, can result in delay in starting the turbine or even failure to start. In order to overcome this problem, according to the method of deploying the ram air turbine 2 of the aircraft of the present invention, lubricating oil for the gear meshes of the two right angled gear sets 9 and 10 is stored in oil sumps 11 and 12 which are away from the gear meshes when the ram air turbine is located in the stowed position A. This isolates the stored lubricating oil from the gear meshes. Thereafter, when the ram air turbine 2 is pivotably moved to the deployed position B, the stored lubricating oil is applied to the gear meshes so as not to excessively delay or prevent start-up of the ram air turbine. That is, the drag load on the gear meshes from the lubricating oil is controlled by delaying application of the stored lubricating oil to the gear meshes, at least when the stored lubricating oil is cold and viscous, until after start-up of the ram air turbine. The cold, viscous oil is not applied to the gear meshes until after the variable pitch blades 7 of the turbine have transitioned from a coarse pitch to a fine pitch position. Preferably, the application of cold, viscous stored lubricating oil to the gear meshes is delayed at least ten to twenty seconds after the ram air, turbine is moved from the stowed position to the deployed position to allow start-up of the ram air turbine.

Figure 2:
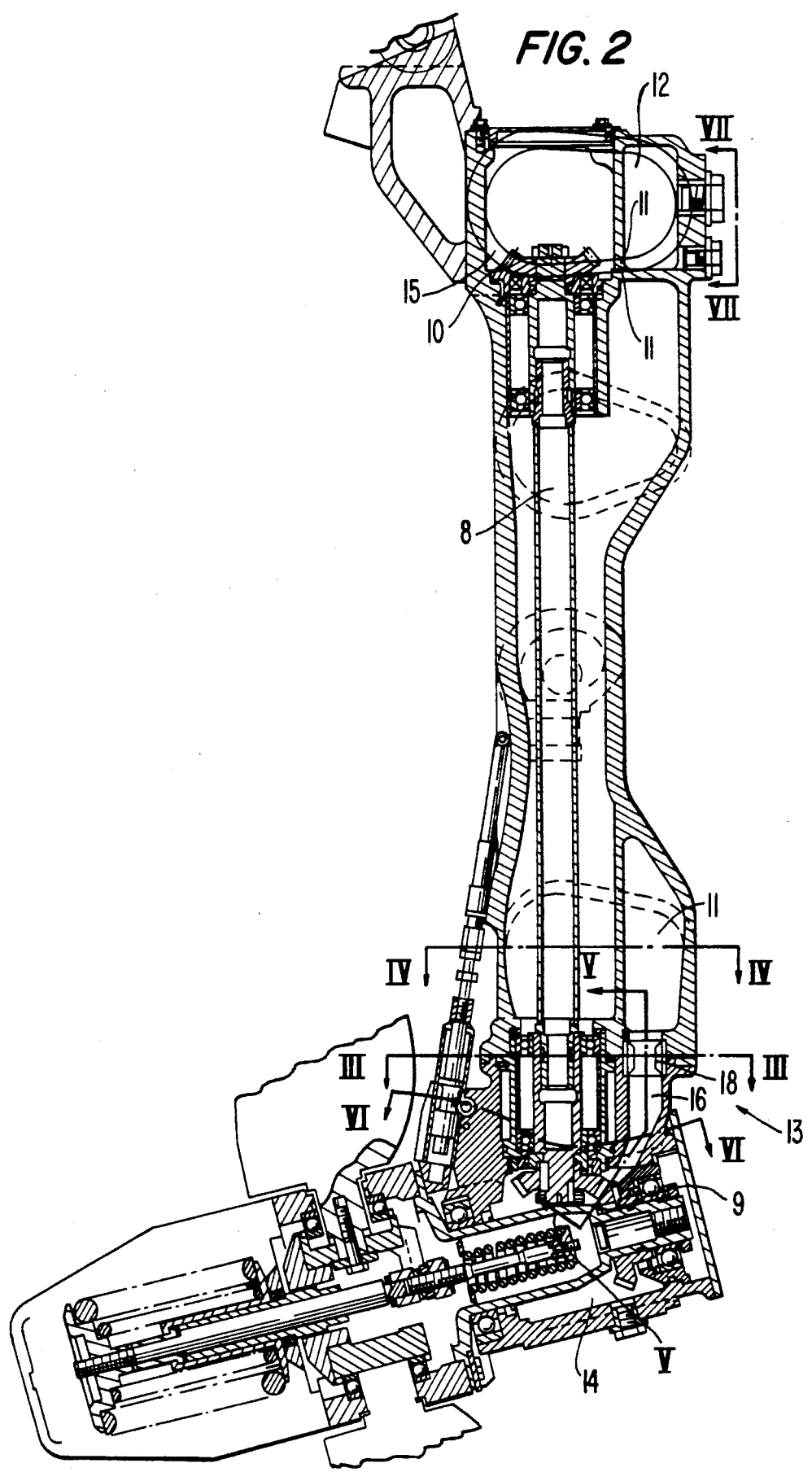
FIG. 2 is an enlarged view of the ram air turbine, 6 partially in cross section, with the turbine in its deployed position.
Figure 3:
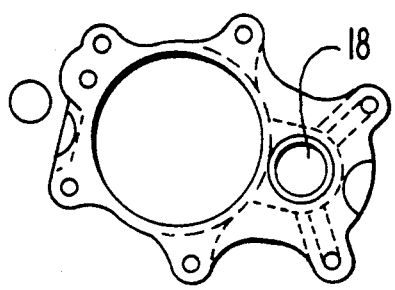
FIG. 3 is a cross-sectional view of the support housing for the ram air turbine taken along the line III—III in FIG. 2.
Figure 4:
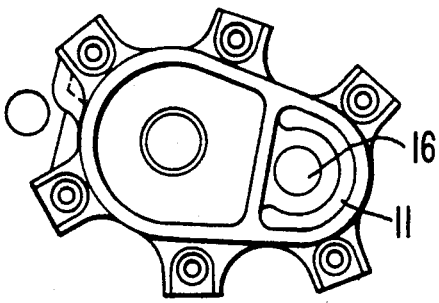
FIG. 4 is another cross-sectional view of the support housing taken along the line IV—IV in FIG. 2 and illustrating a remote sump of an apparatus for lubricating a gear mesh of a gear drive operatively connected to the ram air turbine and extending through the support housing.
Figure 7:
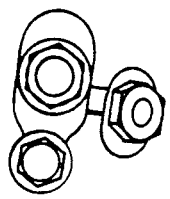
FIG. 7 is a side view of the upper end of the support housing adjacent at second remote lubricating oil sump for A second gear mesh of the gear train, as seen in the direction of arrows VII—VII in FIG. 2.
Figure 6:
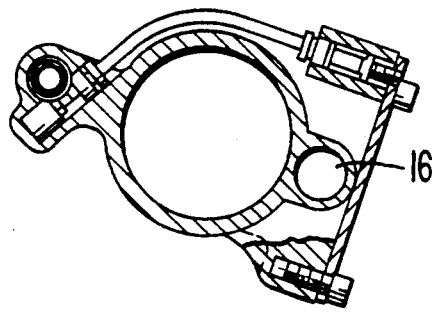
FIG. 6 is a cross-sectional view through the support housing taken along the line VI—VI in FIG. 2.
Figure 5:
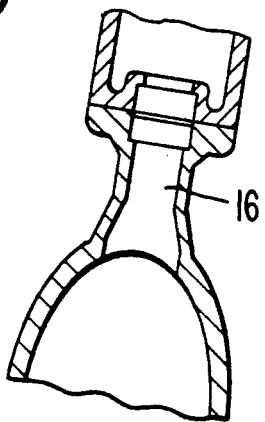
FIG. 5 is a cross-sectional view through the support housing taken along the line V—V in FIG. 2 which extends the longitudinal central axis of a passage communicating the remote lubricating oil sump to a gearbox sump, with a restrictor holding portion of the passage being illustrated, the restrictor itself not being shown.
Figure 8:
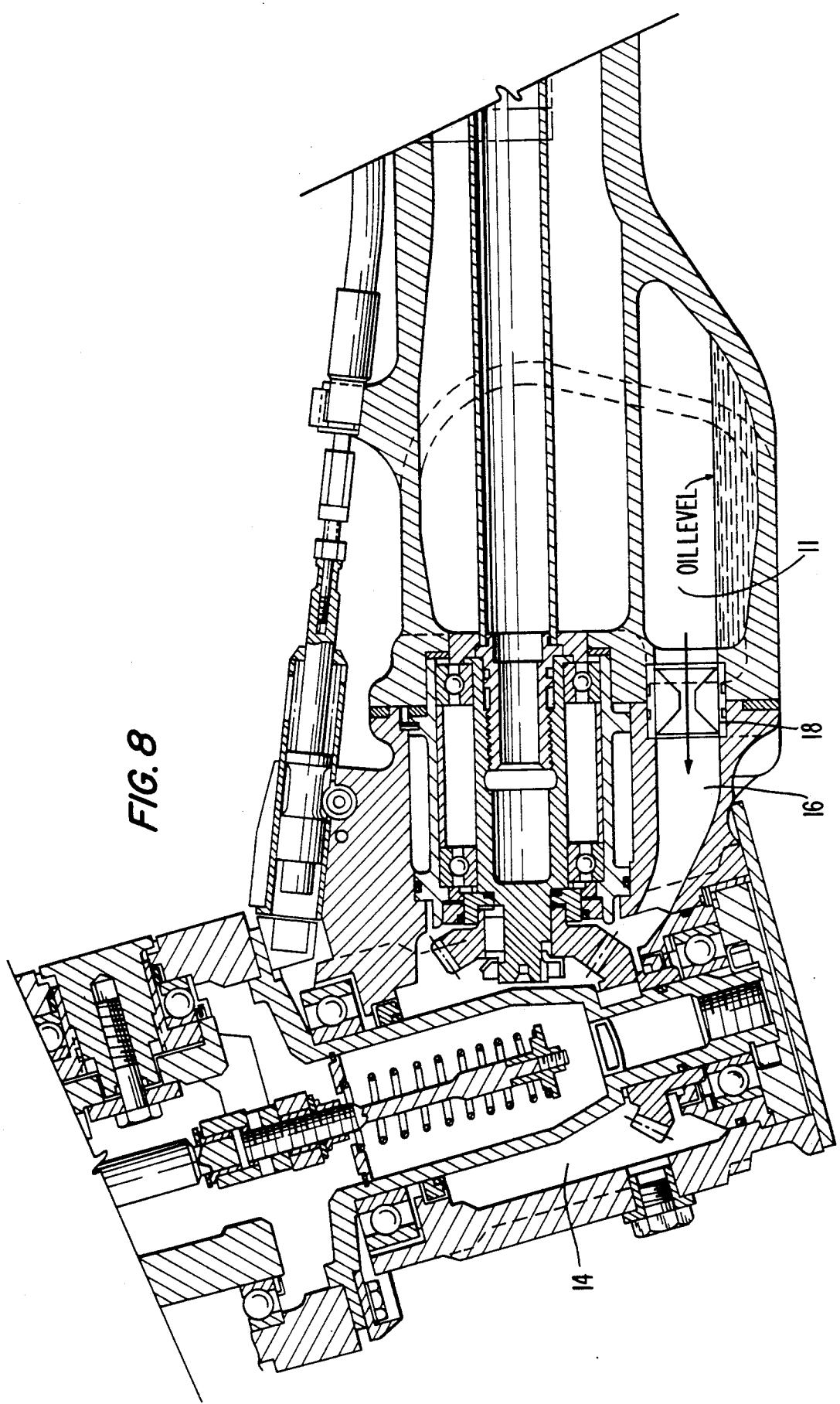
FIG. 8 is an enlarged view of a portion of the support casing and gear drive with the turbine in the stowed position and depicting a remote oil sump, gearbox oil sump, and communicating passage with oil metering orifice therein.

The apparatus 13 of the invention for lubricating the gear meshes of the right angled gear sets 9 and 10 of gear drive 8 comprises the remote oil sumps 11 and 12 and also gearbox sumps 14 and 15 in which the gear meshes are respectively located. Lubricating oil passages 16 and 17 extend between respective ones of the remote oil sumps 11 and 12 and the gearbox sumps 14 and 15 for conveying lubricating oil back and forth between the respective pair of sumps. The lubricating oil passages each include an oil metering orifice, 18 and 19, which controllably delay the flow of lubricating oil through the passages when the oil is cold and viscous. As can be seen from a consideration of FIGS. 1, 2 and 8, in the deployed position B of the ram air turbine 2, the remote oil sumps 11 and 12 are located higher than their associated gearbox sumps 14 and 15 so that gravity causes the lubricating oil to flow through the lubricating oil passages 16 and 17 from the remote sumps to the gearbox sumps. On the other hand, in the stowed position A, the gearbox sumps 14 and 15 are higher than the remote sumps 11 and 12 so that gravity causes the lubricating oil to flow through the passages from the gearbox sumps to the remote sumps thereby isolating the stored lubricating oil from the gear meshes.

In the illustrated embodiment, the diameter of the lubricating oil passage 16 is ⅛ inch except in the area of oil metering orifice 18 wherein the diameter of the passage is reduced to less than ⅛ inch, preferably 0.75 −0.80 inch. When the stored lubricating oil in the remote oil sump 11 is reduced to a temperature of −20° F. to −85° F., the smaller diameter oil metering orifice 18 will restrict the oil flow so that there is a delay of at least ten to twenty seconds before the stored oil can reach the right angled gear set 9 in the gearbox sump 14 for lubricating the gear mesh. This allows sufficient time for the ram air turbine to attain near normal operating speed with an aircraft travelling in the air at a speed above its stall speed. The short time that the gear mesh is without lubricating oil is not sufficient to cause scoring of the gears from lack of lubrication. When the stored oil temperature is greater than −20° F., the smaller diameter oil metering orifice 18 does not act as a restrictor, i.e. does not substantially restrict oil flow, so that the flow time from the remote oil sump 11 to the gearbox oil sump 14 is less than ten seconds.

While we have shown and described only one embodiment in accordance with the present invention, it is understood that the same is not limited thereto, but is susceptible to numerous changes and modifications as known to those skilled in the art. Therefore, we do not wish to be limited to the details shown and described herein, but intend to cover all such changes and modifications as are encompassed by the scope of the appended claims.

We claim:

1. A method of deploying a ram air turbine of an aircraft, the turbine being movable relative to the aircraft between a stowed position where the turbine is inoperative and a deployed position where the turbine is operated, a gear drive being operatively connected to the turbine and including at least one gear mesh, said method comprising storing lubricating oil for the at least one gear mesh away from the at least one gear mesh when the turbine is located in the stowed position, and when the turbine is moved from the stowed position to the deployed position applying the stored lubricating oil to the at least one gear mesh so as not to excessively delay or prevent start-up of the turbine.

2. The method according to claim 1, including delaying application of the stored lubricating oil to the at least one gear mesh until after start-up of the turbine when the stored lubricating oil is cold and viscous.

3. The method according to claim 1, wherein said turbine includes variable pitch blades, and wherein the lubricating oil is applied to the at least one gear mesh after the blades have transitioned from a course pitch to a fine pitch during start-up.

4. The method according to claim 1, wherein the step of applying the stored lubricating oil to the at least one gear mesh includes flowing the stored oil to the at least one gear mesh through at least one oil metering orifice.

5. The method according to claim 4, wherein the at least one oil metering orifice includes a cylindrical passage which has a diameter of 0.75–0.80 inch.

6. The method according to claim 1, including delaying the application of the stored oil to the at least one gear mesh for at least ten to twenty seconds after the turbine is moved from the stowed position to the deployed position when the stored lubricating oil is cold and viscous to allow start-up of the turbine.

7. The method according to claim 1, wherein the step of storing lubricating oil includes storing the oil in at least one remote oil sump spaced from the at least one gear mesh for isolating the stored oil from the at least one gear mesh.

8. The method according to claim 7, wherein the step of applying the stored lubricating oil includes controlling the oil flow from the at least one remote sump to at least one gearbox sump for the at least one gear mesh to allow proper start-up of the ram air turbine.

9. A method of deploying a ram air turbine on an aircraft with a gear drive operatively connected to the turbine and having at least one gear mesh, the ram air turbine being movable relative to the aircraft between a stowed position where the turbine is inoperative and a deployed position where the turbine is operated, the method comprising moving the ram air turbine from the stowed position to the deployed position for operating the turbine and controlling the drag load on the at least one gear mesh of the gear drive from a lubricating oil for the at least one gear mesh at least when the lubricating oil is cold and viscous so as not to excessively delay or prevent start-up of the ram air turbine, wherein the step of controlling the drag load includes delaying application of the lubricating oil to the at least one gear mesh, at least when the lubricating oil is cold and viscous, until after the ram air turbine has been started.

10. The method according to claim 9, further comprising the step of isolating the lubricating oil from the at least one gear mesh prior to moving the ram air turbine from the stowed position to the deployed position.

11. The method according to claim 10, wherein the step of isolating includes flowing the lubricating oil by the force of gravity to at least one location away from the at least one gear mesh when the ram air turbine is moved to the stowed position.

12. An apparatus for lubricating a gear mesh of a gear drive operatively connected to a ram air turbine of an aircraft, said ram air turbine being movable relative to the aircraft between a stowed position where the turbine is inoperative and a deployed position where the turbine is operated, comprising a remote sump for storing lubricating oil for the gear mesh when the ram air turbine is moved to the stowed position, the sump being located away from the gear mesh, a gearbox sump in which the gear mesh is located, a lubricating oil passage extending between the remote sump and the gearbox sump for conveying lubricating oil back and forth between the respective sumps, the lubricating oil passage including an oil metering orifice which delays the flow of lubricating oil through the passage when the oil is cold and viscous.

13. The apparatus according to claim 12, wherein in the deployed position of the ram air turbine the remote sump is located higher than the gearbox sump so that gravity causes the lubricating oil to flow through the passage from the remote sump to the gearbox sump, and in the stowed position the gearbox sump is higher than the remote sump so that gravity causes the lubricating oil to flow through the passage from the gearbox sump to the remote sump.

14. The apparatus according to claim 12, wherein the oil metering orifice is sized to delay the delivery of cold, viscous lubricating oil to the gearbox sump at least ten to twenty seconds from the time the ram air turbine is moved to the deployed position to allow start-up of the ram air turbine.

15. The apparatus according to claim 12, wherein the oil metering orifice has a diameter of 0.75–0.80 inches.

16. The apparatus according to claim 12, wherein the gear drive comprises two gear meshes, each of said two gear meshes being provided respectively with said remote sump, said passage and said gearbox sump.

17. An apparatus for lubricating a gear mesh of a gear drive operatively connected to a ram air turbine on an aircraft, the ram air turbine being movable relative to the aircraft between a stowed position where the turbine is inoperative and a deployed position where the turbine is operated, comprising a remote sump for storing lubricating oil for the gear mesh, the remote sump isolating oil from the gear mesh when the ram air turbine is in the stowed position, and means for controllably delivering lubricating oil from the remote sump to the gear mesh when the ram air turbine is moved from the stowed position to the deployed position so that when the lubricating oil is cold and viscous it does not reach the gear mesh until the ram air turbine has started operation.

18. The apparatus according to claim 17, wherein the means for controllably delivering comprises a passage between the remote oil sump and a gearbox oil sump in which the gear mesh is located, the passage including a metering orifice which delays the flow of cold, viscous oil from the remote sump to the gearbox sump until the ram air turbine has started operation.

* * * * *